Sept. 5, 1967   E. D. McCRORY, JR ET AL   3,339,945
FUSED TUBULAR MEMBER AND COUPLING ARRANGEMENT
Filed Dec. 6, 1965
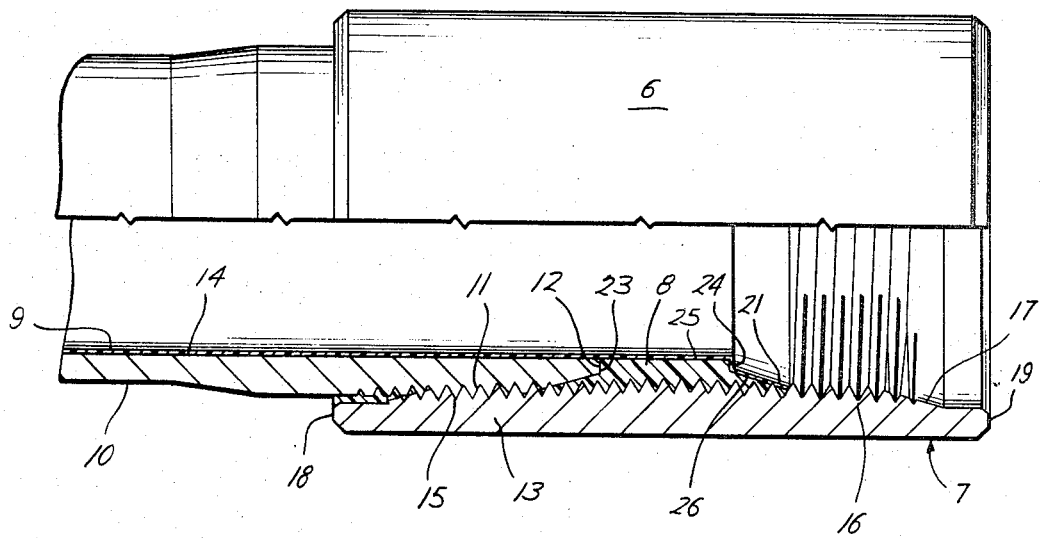
Edwin D. McCrory, Jr.
Walter W. Walling
    INVENTORS
BY Hayden & Pravel
ATTORNEY

3,339,945
FUSED TUBULAR MEMBER AND COUPLING ARRANGEMENT

Edwin D. McCrory, Jr., and Walter W. Walling, Houston, Tex., assignors to Plastic Applicators, Inc., a corporation of Texas
Filed Dec. 6, 1965, Ser. No. 511,685
3 Claims. (Cl. 285—55)

The present invention relates to a connection between a coupling and a tubular member, and more particularly, to an arrangement whereby a coupling and a tubular member that are threadedly connected may be integrally fused together by means of a plastic mass.

It is well known in the art to coat tubular members internally with a corrosion resistant material to prevent or impede the corrosive action of oil and gas and other products on the tubular members through which they are conducted. Although various schemes and devices have been developed for applying a protective coating to the interior of tubular members, a persistent problem has been to provide an arrangement to protect tubular members at the coupling which connects them together. The slightest gap or unprotected spot is subject to attack by corrosive fluids, and the most difficult part of a string of tubular members to protect against corrosion is each coupling connection.

An object of the present invention is to provide a new and improved means for protecting the threaded portions of internally coated tubular members from the corrosive action of fluids conducted therethrough.

Another object of the present invention is to provide a new and improved coupling arrangement for connecting tubular members together in which a thermoplastic mass on the coupling is fused with a thermoplastic internal coating formed integrally in a tubular member to provide a homogeneous and continuous coating between the tubular member and coupling.

And yet another object of the present invention is to provide a coupling in which a plastic mass on the coupling is fused with a plastic protective film coating on the interior surface of the tubular member.

A further object of the present invention is to provide a coupling arrangement for tubular members in which a plastic mass formed integrally in the coupling is fused with a plastic coating integrally formed on the interior of the tubublar member threaded into one end of said coupling and wherein the plastic mass in said coupling also forms an annular shoulder for sealably engaging another tubular member threaded into the other end of said coupling.

Other objects and advantages of the present invention will become more readily apparent from a consideration of the following description and drawing wherein:

FIG. 1 is a view partly in elevation and partly in section illustrating one embodiment of the present invention.

Considering the drawing in detail, the numeral 6 designates generally the device of the present invention which includes a coupling designated generally 7 having an annular seal or ring 8 formed integrally therein.

The pipe coupling 7 includes a tubular body 13 which has threads 15 and 16 formed in its inner surface or periphery 17 and which threads extend longitudinally from adjacent opposite ends 18 and 19 for threadedly connecting joints of tubing or pipe 10 into each end of the coupling 13. The drawing shows only one tubular member 10 threadedly connected with the coupling 7.

The annular ring or seal 8, formed of thermoplastic or heat fusible material as will be explained more fully hereinafter, extends circumferentially of the inner periphery 17 of the tubular body 13 and is integrally formed therewith intermediate the ends 18 and 19 by any suitable means.

The ring or seal 8 is preferably formed so as to extend radially inwardly of the inner periphery 17 of the body 13 sufficiently to provide annular shoulders 23 and 24 extending circumferentially of the tubular body 13 for engaging the ends of joints of tubing or pipe 10 threadedly connected into the body 13.

A substantially cylindrical opening 25 is formed in the ring or seal 8, and the opening 25 has substantially the same diameter as the inside diameter of the joints of tubing 10 connected to the coupling 7 to provide a uniform bore throughout the string of tubing.

In the preferred embodiment of the present invention, a coating of thermoplastic or heat fusible material is wiped on the thread portion 11 adjacent the end 12 of the tubing 10 prior to threading the joint of tubing 10 into the coupling 7. The material wiped on the thread portion 11 of the coupling may be any one of several coatings well known to those skilled in the art, such as a suitable vinyl, epoxy, or polyester. The plastic mass on the thread portion 11 takes the place of the thread dope normally employed. The tubing 10 and the coupling 7 are then made up so that the end portion 12 of the tubing 10 engages the annular shoulder 23 of the seal 8, and a coating or film 9 of thermoplastic or heat fusible materials is applied internally of the tubing 10 and the coupling 7 in a manner well known in the art. The continuous film or protective coating 9 extends longitudinally of the inner periphery 14 of the tubular member 10 and covers the seal or ring 8 as well as the juncture of the abutting ends of the tubular member 10 and seal ring 8. The coating or protective film 9 also extends longitudinally beyond the ring or seal to cover one or more of the threads 16 adjacent the annular shoulder 24 with a relatively thin film or coating 21 of thermoplastic material. Between the annular shoulder 24 and the thinly coated portion 21 a tapered or inclined annular surface 26 may be formed on the ring 8 for engaging and positioning the end of the tubular member (not shown) which engages the annular shoulder 24.

With the tubular member 10 threaded into engagement with the ring 8, the continuous coating or film 9 on the inner peripheries respectively of the tubing 10 and the ring 8, and the coating on the threaded portion 11 are heated to a sufficient temperature to fuse together into a unitary homogeneous plastic mass forming an integral connected tubular member and coupling with a protective coating therefor.

Broadly, the present invention relates to an arrangement for integrally forming a coupling on a tubular member by fusing a plastic mass internally and externally of the coupling with a plastic mass internally of the coupling to sealably connect the tubular member and coupling together.

What is claimed is:
1. A tubular member and coupling arrangement comprising:
   (a) a tubular member,
   (b) a coupling,
   (c) a threaded surface on the interior of said coupling and exterior of said tubular member whereby said coupling and tubular member may be threadedly engaged,
   (d) an annular member formed integrally with the interior of said coupling intermediate the ends thereof and providing an annular shoulder against which said tubular member is abutted,
   (e) a synthetic resin layer at the interface of the threaded surface between said coupling and tubular member, (f) a synthetic resin coating on the interior of said tubular member extending over the inner surface of said annular member, (g) said synthetic resin layer and said synthetic resin coating hardened by heat in situ into a homogeneous mass to fuse said coupling and tubular member together.

2. The invention of claim 1 wherein said coupling is provided with another interior threaded surface for engagement with a tubular member.

3. The invention of claim 1 wherein said synthetic resin layer and said synthetic resin coating are formed of a thermoplastic resin.

References Cited

UNITED STATES PATENTS

| 1,120,731 | 12/1914 | McIlroy. | |
|---|---|---|---|
| 1,859,311 | 5/1932 | McEvoy | 285—55 X |
| 2,241,517 | 5/1941 | Moise | 285—284 X |
| 2,690,934 | 10/1954 | Holcombe. | |
| 2,781,206 | 2/1957 | Ragland | 285—292 X |
| 3,101,207 | 8/1963 | Pavel et al. | 285—291 |
| 3,107,421 | 10/1963 | Turnbull | 285—87 X |

FOREIGN PATENTS 1,022,860  1/1958  Germany.

CARL W. TOMLIN, *Primary Examiner.*

R. G. BERKLEY, *Assistant Examiner.*